(No Model.)　　　　　　J. J. LACEY.　　　　2 Sheets—Sheet 1.
COUPLING FOR CAR HEATING APPARATUS.
No. 295,255.　　　　　　　Patented Mar. 18, 1884.
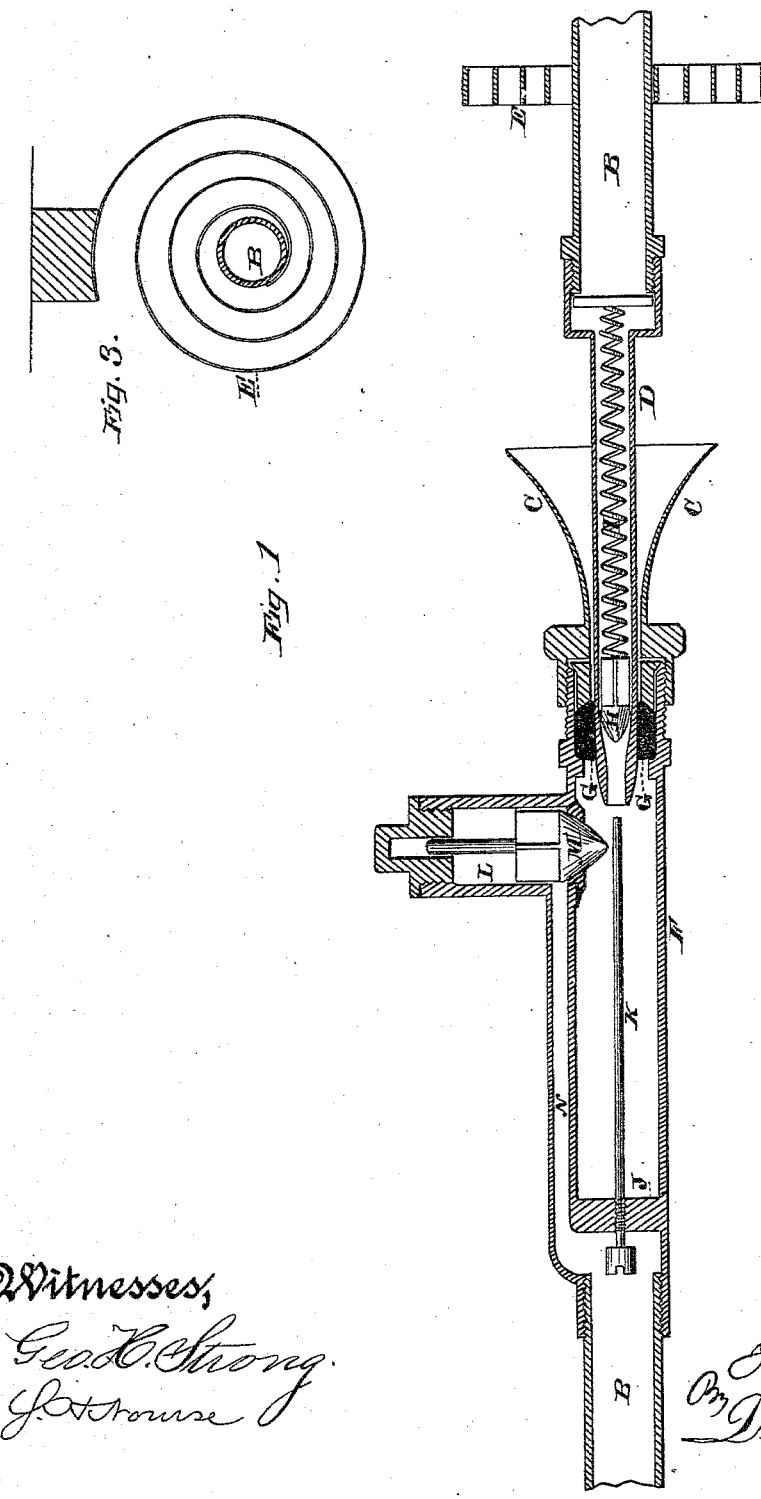
Witnesses,
Geo. H. Strong.
J. H. Krouse.
Inventor,
John J. Lacey
By Dewey & Co.
Attorneys

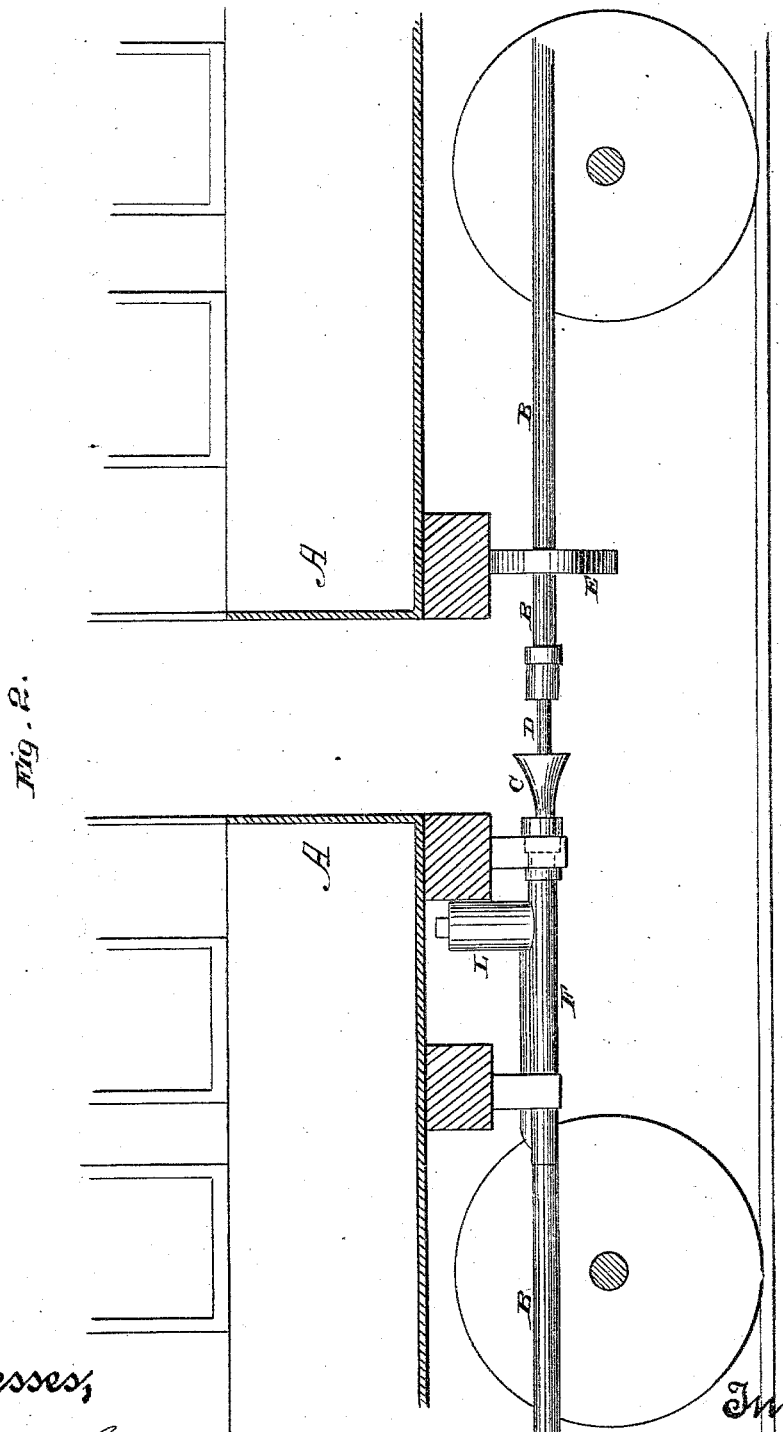

UNITED STATES PATENT OFFICE.

JOHN J. LACEY, OF SAN FRANCISCO, ASSIGNOR TO THE LACEY AUTOMATIC COUPLING COMPANY, OF OAKLAND, CALIFORNIA.

COUPLING FOR CAR-HEATING APPARATUS.

SPECIFICATION forming part of Letters Patent No. 295,255, dated March 18, 1884.

Application filed February 24, 1883. Renewed February 13, 1884. (No model.)

*To all whom it may concern:*

Be it known that I, JOHN J. LACEY, of the city and county of San Francisco, State of California, have invented an Improved Coupling for Car-Heating Apparatus; and I hereby declare the following to be a full, clear, and exact description thereof.

My invention relates to a means for heating cars from a detached or distant source of supply without the presence of fire in the cars; and it consists, principally, of a joint or coupling for pipes extending beneath the cars, so constructed as to be automatically connected and a passage opened throughout the whole length whenever two cars come together and are coupled, thus enabling me to convey steam, hot air, or other suitable medium into heaters placed in each car throughout the train, as will be more fully explained by reference to the accompanying drawings, in which—

Figure 1 is a longitudinal section of my coupling. Fig. 2 shows its application. Fig. 3 is a side view of the spring E.

A A are the meeting ends of two cars, having the usual coupling devices for connecting them.

My invention is designed for the purpose of conveying hot air or steam either from the engine or from any convenient source of supply through pipes, which are secured beneath the cars, and, by means of cocks or valves, are connected with heating drums or pipes within each car, so that a greater or less amount can be turned on and the desired temperature maintained. The pipes B, which extend beneath the cars, may be suitably protected by non-conductors, and at one end are connected with the female coupling C, and at the other end with the male coupling D. One end of the pipe should be fixed rigidly enough to the car-body to prevent end motion, while the opposite is supported, preferably, by elastic coils E, which have their outer sides secured to the frame-timbers of the car, while the inner portions of the coils support the pipe and allow it considerable motion in every direction. The male portion D of the coupling may be attached to this free or movable end of the pipe, and the part C, with which it connects, has a wide conical or funnel-shaped mouth, into which the part D will enter as the cars come together, and by the funnel and its own freedom of motion it is directed into the tube F, passing through a stuffing-box, G, which makes a tight joint, and at the same time allows the tube D to slide in and out to accommodate itself to the motion of the cars.

Near the mouth of the tube D is a valve, H, which is kept closed by a spring, I, which presses upon its back and prevents any escape of air or steam from it when it is not coupled with the pipe from another car. The tube F has a partition, J, across it at some distance from its outer end, and a rod, K, is screwed into it, so that its end extends to a point near the stuffing-box G, the rod being exactly in the center of the tube, so that when the tube D passes through the stuffing-box the end of the rod K will enter its open mouth and push the valve H back, holding it open as long as the parts remain coupled.

Upon top of the tube F, just behind the stuffing-box G, is a chamber, L, having within it a valve, M, which is seated so as to close an opening from this chamber into the tube F. From the chamber L a passage, N, extends along parallel with the tube F, and opens into it beyond the partition J.

It will be seen that any pressure of air or steam within the pipe B, which connects with the tube F, will be confined to it and the passage N, the valve M preventing its escape in the same manner that the valve H closes the pipe D. When the pipe D enters the pipe F of the opposite coupling, it passes under the conical or pointed end of the valve M, thus lifting it at the same time when the rod K enters the tube D, and forces the valve H open, so that there will be a free communication through the pipes and couplings from car to car. Each valve closes instantly as soon as the couplings are separated, so that none of the contents of the pipes will escape.

Having thus described my invention, what I claim as new, and desire to secure by Letters Patent, is—

1. The pipes B, by which steam or hot air may be conveyed beneath the cars, in combination with the tubes D and F, the bell-shaped guiding-mouth C, and the coiled supporting-spring E, substantially as herein described.

2. The tube F, with the partition J, passage N, chamber L, valve M, and the stem or rod K, in combination with the tube D, the valve H, spring I, and the bell-shaped guiding-mouth C and stuffing-box G, substantially as herein described.

In witness whereof I hereunto set my hand.

JOHN J. LACEY.

Witnesses:
S. H. NOURSE,
G. W. EMERSON.